United States Patent [19]

Shibayama et al.

[11] Patent Number: 5,313,130
[45] Date of Patent: May 17, 1994

[54] SUPERCONDUCTION BEARING

[75] Inventors: Motoaki Shibayama; Takenori Tada; Terutsugu Oyama; Fumihiko Ishikawa; Hiromasa Higasa, all of Kagawa, Japan

[73] Assignees: Kabushiki Kaisha Shikoku Sogo Kenkyusho; Shikoku Denryoku Kabushiki Kaisha, both of Kagawa; Mitsubishi Denki Kabushiki Kaisha; Seiko Epson Corporation, both of Tokyo, all of Japan

[21] Appl. No.: 921,659

[22] Filed: Jul. 30, 1992

[30] Foreign Application Priority Data

Jul. 30, 1991 [JP] Japan .................. 3-190353

[51] Int. Cl.⁵ .................. H02K 7/09; G11B 5/55
[52] U.S. Cl. .................. 310/90.5; 310/156; 505/876
[58] Field of Search .................. 310/40 R, 52, 90.5, 310/74, 156; 505/876, 877, 878, 879, 703, 707, 727, 903

[56] References Cited

U.S. PATENT DOCUMENTS

| | | | |
|---|---|---|---|
| 3,493,274 | 2/1970 | Emslie et al. | 310/90.5 |
| 3,673,444 | 6/1972 | Kawabe et al. | 310/10 |
| 4,886,778 | 12/1989 | Moon et al. | 505/1 |
| 4,920,291 | 4/1990 | McSparran | 310/90.5 |
| 5,126,611 | 6/1992 | Armstrong et al. | 310/90.5 |
| 5,130,588 | 7/1992 | Armstrong et al. | 310/90.5 |
| 5,159,219 | 10/1992 | Chu et al. | 310/90.5 |
| 5,220,232 | 6/1993 | Rigney, II et al. | 310/90.5 |
| 5,256,638 | 10/1993 | Weinberger et al. | 505/1 |

OTHER PUBLICATIONS

Hayakawa et al., "Advances in Superconductivity IV", Oct. 1991, pp. 1085-1088.

Primary Examiner—Steven L. Stephan
Assistant Examiner—D. R. Haszko
Attorney, Agent, or Firm—Keck, Mahin & Cate

[57] ABSTRACT

A superconduction bearing is provided in which the load capacity and rigidity of a rotary member are improved, run-out of the rotary member is prevented to support the rotary member in a stable, non-contacting manner, and manufacturing cost is reduced. The superconduction bearing includes a rotary member and a disk formed on the rotary member. The disk has permanent magnets provided thereon. The permanent magnets are magnetized to have opposite poles on top and bottom sides thereof. A permanent magnet section is thus formed by the disk and the permanent magnets. Superconductors are concentrically provided for rotatably supporting the rotary member. The permanent magnet section and the superconductor section are positioned opposite to each other. The width and thickness of the permanent magnets are set to 5 to 10 times the distance between the permanent magnet section and the superconductor section.

4 Claims, 9 Drawing Sheets

SUPERCONDUCTION BEARING

FIELD OF THE INVENTION

The present invention relates to a superconduction bearing which is applicable to: e.g., hydraulic machines or machine tools requiring high speed rotation; a power storage apparatus for converting excess electric power into the kinetic energy of a flywheel for storage; or gyroscopes.

PRIOR ART

In recent years, superconduction bearings have been envisaged which can support a rotating body in a non-contacting manner.

Early ones of such bearings comprised: an annular permanent magnet provided concentrically on a rotary member and having a magnetization exhibiting opposite poles on its ends opposed in the direction of the axis of rotation; and an annular superconductor positioned opposite to an end surface of this permanent magnet with a distance from such surface in the direction of the axis of rotation of the rotary member. To enhance the load capacity and rigidity, a bearing has subsequently been proposed which has a plurality of annular permanent magnets disposed concentrically and having respective magnetizations such that neighbouring magnets have polarities opposite to each other (Japanese Patent Application No. 051430/1991).

PROBLEM TO BE SOLVED BY THE INVENTION

These superconduction bearings, however, have a problem in that they require a relatively large number of superconductors and permanent magnets, which leads to a relatively high manufacturing cost.

The reason for such problem is thought to be as follows: Larger dimensions of the permanent magnets and superconductors used allow a larger spacing to be provided between the permanent magnets and superconductors and additionally allow a higher load capacity. There is however a tendency for magnets and superconductors to be provided in excess because the extent of the fact described immediately before is not clear.

MEANS FOR SOLVING THE PROBLEM

To solve the above mentioned problem, a first superconduction bearing according to the present invention comprises a movable part including a rotary member, a disk being formed on the rotary member and having a center axis which is coincident with the axis of rotation of the rotary member, annular permanent magnets being provided on the disk and having a center on said axis of rotation, the permanent magnets being magnetized to have one and the opposite poles on the top and bottom sides of said disk, respectively, a permanent magnet section being thus formed by said disk and said permanent magnets. The bearing further comprises a fixed part including a superconductor section positioned opposite to the disk of said permanent magnet section with a spacing therebetween, said superconductor section having a superconductor provided thereon concentrically with said axis of rotation for floating said permanent magnet section, said permanent magnet section and said superconductor section being positioned opposite to each other with a distance therebetween in the direction of said axis of rotation, said superconduction bearing being characterized in that:

the width of said permanent magnets, which is their radial dimension, and the thickness of said permanent magnets, which is their dimension in the direction of said axis of rotation, are 5 to 10 times said distance between said permanent magnet section and said superconductor section.

A second superconduction bearing according to the present invention, which is a modification of the first inventive superconduction bearing, is characterized in that the thickness of said superconductor is 0.5 to 1.5 times the width of the permanent magnets.

A third superconduction bearing according to the present invention comprises a movable part including a rotary member having a permanent magnet section which is formed by a disk fixedly provided on the rotary member, and by annular permanent magnets positioned, concentrically with the disk. The bearing further comprises a fixed part including a superconductor section for rotating said rotary member, the superconductor section being provided with a superconductor positioned opposite to the outer periphery of said disk with a distance therebetween in radial directions of said rotary member, each of said permanent magnets being magnetized to have one pole on its end adjacent to the axis of rotation and the opposite pole on its opposite, outer end, the bearing being characterized in that:

the width and the thickness of said permanent magnets are 5 to 10 times said distance between said permanent magnet section and said superconductor section.

A fourth superconduction bearing according to the present invention, which is a modification of the third inventive superconduction bearing, is characterized in that the thickness of said superconductors is 0.5 to 1.5 times the thickness of the permanent magnets.

OPERATION

In any of the first through fourth embodiments, the permanent magnet section and the superconductor section are held in a state in which they are spaced apart by a predetermined distance, whereby the rotary member is supported in a non-contacting manner.

In the cases of the first and second embodiments, for example, the permanent magnet section comprises a disk fixed to the rotary member in a concentric manner with respect to the axis of rotation, and annular permanent magnets, the axial opposite ends of each said permanent magnet having opposite magnetic poles, whereby the magnetic flux is emitted and absorbed in the axial directions, and the magnetic flux density decreases as the axial distance increases. The magnetic flux density becomes ⅓ to 1/5 at a position corresponding to the width of the magnets (see FIG. 9). The position where the magnetic flux decrease rate (gradient) becomes ½ is the same.

Since the repulsive force exerted by the superconductor upon the magnets, i.e. the force floating the rotary member, is proportional to the rate of decrease (or gradient) of the magnetic flux, a large floating force can be achieved by placing the superconductor as close to the magnets as possible between the surface of the magnets and a surface spaced away by a distance corresponding to the width of the magnets.

Even if the spacing between the magnetic section and the superconductor section is large for reasons related to manufacturing techniques, effects similar to the above mentioned ones may be achieved by using magnets having a large width and a large thickness.

DETAILED DESCRIPTION OF THE PREFERRED EMBODIMENTS

Embodiments of the present invention will now be described, with reference to the drawings.

Figure 1:
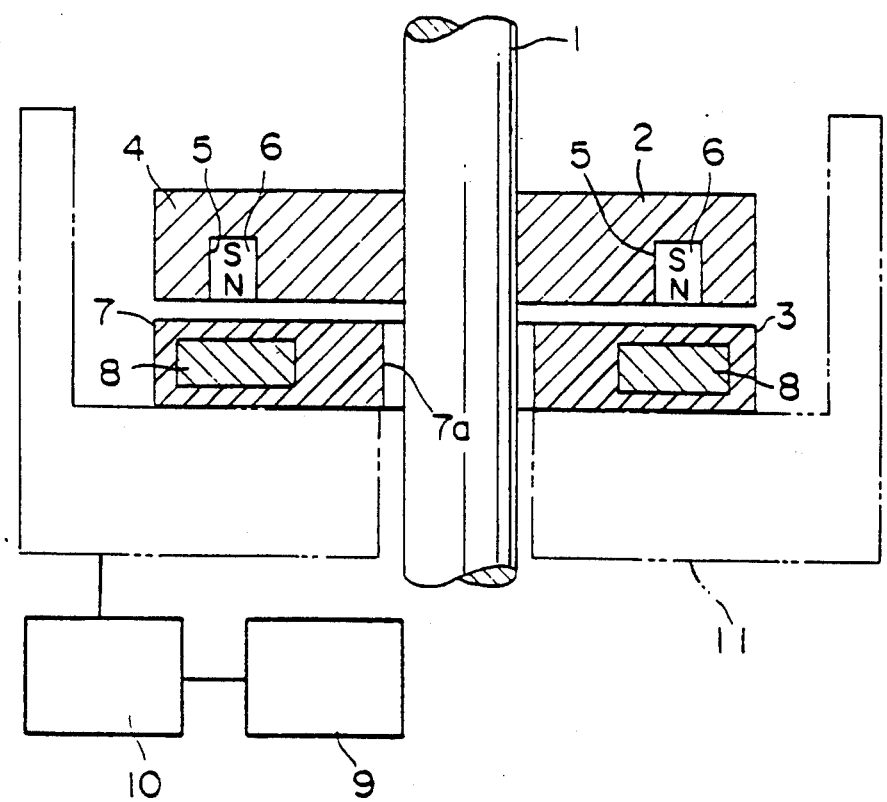
FIG. 1 is a schematic longitudinal sectional view of principal parts of a first embodiment of the superconduction bearing.

FIG. 1 schematically shows principal parts of a first embodiment of the superconduction bearing.

The superconduction bearing includes a housing, not shown, in which an axle-like rotary member 1 and a superconductor section 3 are provided.

The rotary member 1 has a permanent magnet section 2 concentrically provided thereon. An annular superconduction section 3 is provided on the housing opposite to the bottom surface of the permanent magnet section 2 in the axial direction of the rotary member. The permanent magnet section 2 is floated by the superconduction of the annular superconduction section supported by the housing.

The permanent magnet section 2 comprises a horizontal disk 4 of, e.g., copper. The bottom surface of the disk 4 has annular grooves 5 formed thereon which are concentrical with the rotary member 1. An annular permanent magnet 6 is fixedly fitted within each of the grooves 5. The permanent magnets 6 are magnetized such that they have one pole on their top surface and the opposite pole on their bottom surface and the magnetic flux distribution around the axis of rotation will not be affected by rotation. The width and thickness of the permanent magnets 6 are, for example, 10 and 12 millimeters, respectively; five times the spacing (2 millimeters) between the permanent magnet section 2 and the superconductor section 3. Here, the width of the permanent magnets 6 is their dimension in the radial directions of the rotary member 1; the thickness of the permanent magnets 6 is their dimension in the directions in which the axis of rotation of the rotary member 1 extends.

The superconductor section 3 comprises a disk-shaped support 7 of, e.g., copper, and a superconductor 8.

The disk-shaped support 7 is horizontally fixed on a refrigeration case 11, and is in the form of a disk centered at the axis of rotation of the rotary member 1. The refrigeration case 11 is refrigerated by a refrigerator 9 and a temperature control unit 10 for the refrigerator on the housing. The disk-shaped support 7 has a hole 7a through which a lower portion of the rotary member 1 extends with clearance. A plurality of disk-shaped superconductors 8 are embedded in the disk-shaped support 7 around the hole 7a.

The superconductors 8 are disposed annularly and centered at the center of the hole 7a, with their top surface being placed opposite to the bottom surface of the permanent magnets 6. Specifically, the superconductors 8 are placed in a position spaced from the permanent magnets 2, where a predetermined amount of magnetic flux generated by the permanent magnets 2 permeates into them and where the distribution of the permeating magnetic flux will not be affected by the rotation of the rotary member. The thickness of the superconductors 8 is set, e.g., equal to the width of the permanent magnets 6. Each of the superconductors 8 comprises a substrate of yttrium-containing high-temperature superconductor, such as $YBa_2Cu_3O_x$, in which normal-conduction particles ($Y_2Ba_1Cu_1$) are uniformly dispersed; they have properties to arrest the permeation of magnetic flux generated by the permanent magnets 2.

In operation, the superconductors 8 are refrigerated by a suitable refrigerant circulated through the refrigerating case 11, whereby it is kept in a superconducting state. When in the superconducting state, a major part of the magnetic flux generated by the permanent magnet section 2 of the rotary member 1 permeates the superconductors 8 ("pinning" phenomenon). Since normal-conduction particles are uniformly dispersed within the superconductors 8, the distribution of magnetic flux permeating the superconductors 8 is uniform. As a result, the permanent magnet section 2 of the rotary member 1 is as if it were penetrated by virtual pins placed upright through the superconductors 8, whereby the rotary member 1 is arrested by the superconductors 8 together with the permanent magnets 2. The rotary member 1 is thus supported in axial and radial directions in an extremely stable, floating position.

Figure 5:
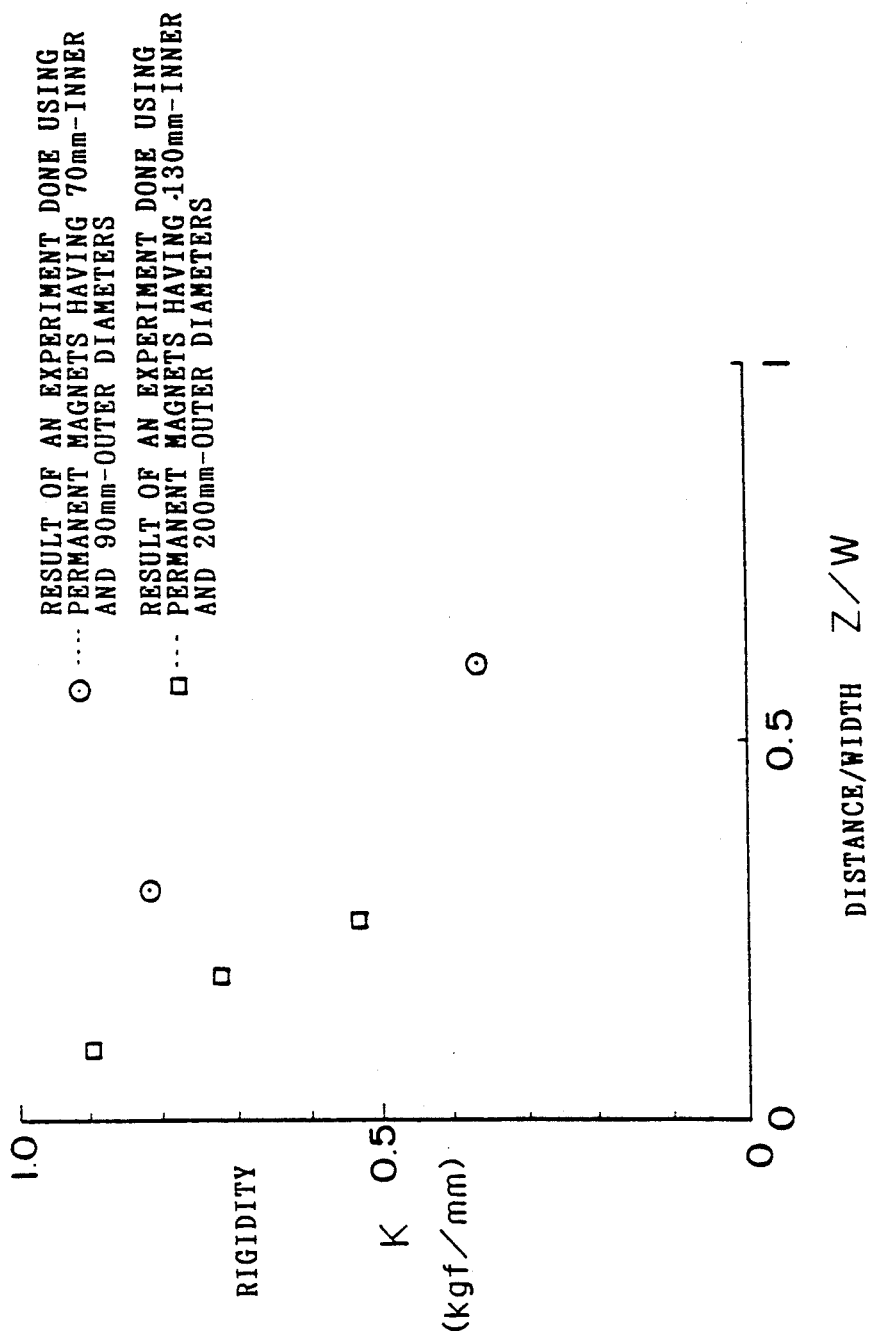
FIG. 5 shows a graph representing part of the results of the experiment done using the first embodiment of the superconduction bearing, indicating the influence of both the permanent magnet width and the spacing.

Within the space under the permanent magnets 6 placed in the lower end of the permanent magnet section 2, the magnetic flux varies as shown in FIG. 5, where the magnetic flux variation rate dB/dZ is large to a position of 10 millimeters corresponding to the width of the magnets. In this embodiment, since the superconductors 8 occupy a space under the permanent magnets, which is 0.33 to 1.5 times the width of the permanent magnets 6, a large magnetic repulsive force will act between the permanent magnet section 2 and the superconductor section 3. In addition, a strong magnetic repulsive force may be achieved when the distance between the permanent magnet section 2 and the superconductors 8 is only slightly larger than the distance at which the magnetic repulsive force and pinning force are balanced. An increase in load capacity and in rigidity can thus be achieved.

EXPERIMENT EXAMPLE 1

A first experiment example has been taken using the apparatus of FIG. 1 to examine the influence of the distance Z and of the magnet thickness t upon the rigidity of the permanent magnet section 2 and superconductor section 3.

One, two or three annular rare-earth element magnets were used as the permanent magnets 6; each such magnet was 90 millimeters in outer diameter, 70 millimeters in inner diameter, and 12 millimeters in thickness, and had a surface magnetic flux of 4000 gausses. Eight superconductors 8 were used, which were 35 millimeters in diameter, and 12 millimeters in thickness; they were embedded in a disk-shaped support 7 in such a manner that their respective centers were equidistantly spaced apart from each other along a circumference of 80 millimeters in diameter.

After the permanent magnet section 2 and the superconductor section 8 were positioned relative to each other, the superconductor section 8 was refrigerated into a superconducting state. Subsequently, the permanent magnet section 2 and the superconductor section 3 were moved toward and away from each other using a tension and compression tester so as to measure the load required to achieve the relative movement. The results are shown in Table 1.

Figure 3:
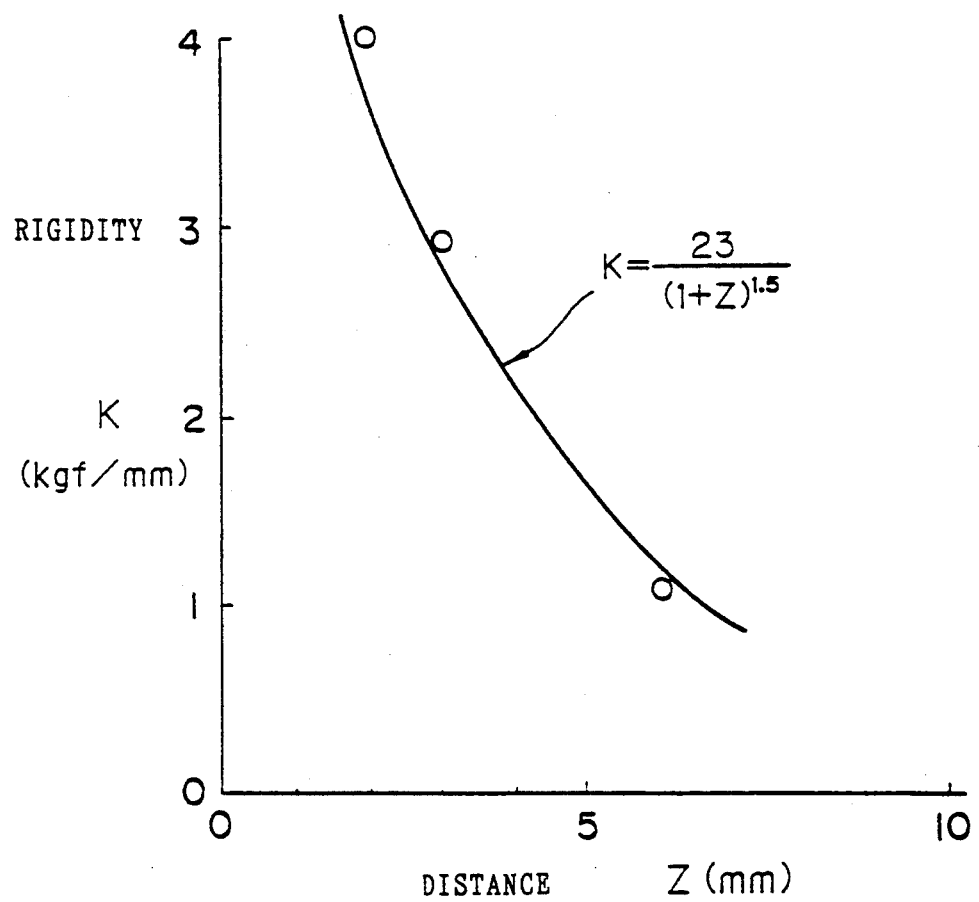
FIG. 3 shows a graph representing part of the results of the experiment done using the first embodiment of the superconduction bearing, indicating the influence of the spacing.

When $n=1.5$, for example, the data of FIG. 3 could be expressed by $K=23(1+z)^{-1.5}$.

Figure 4:
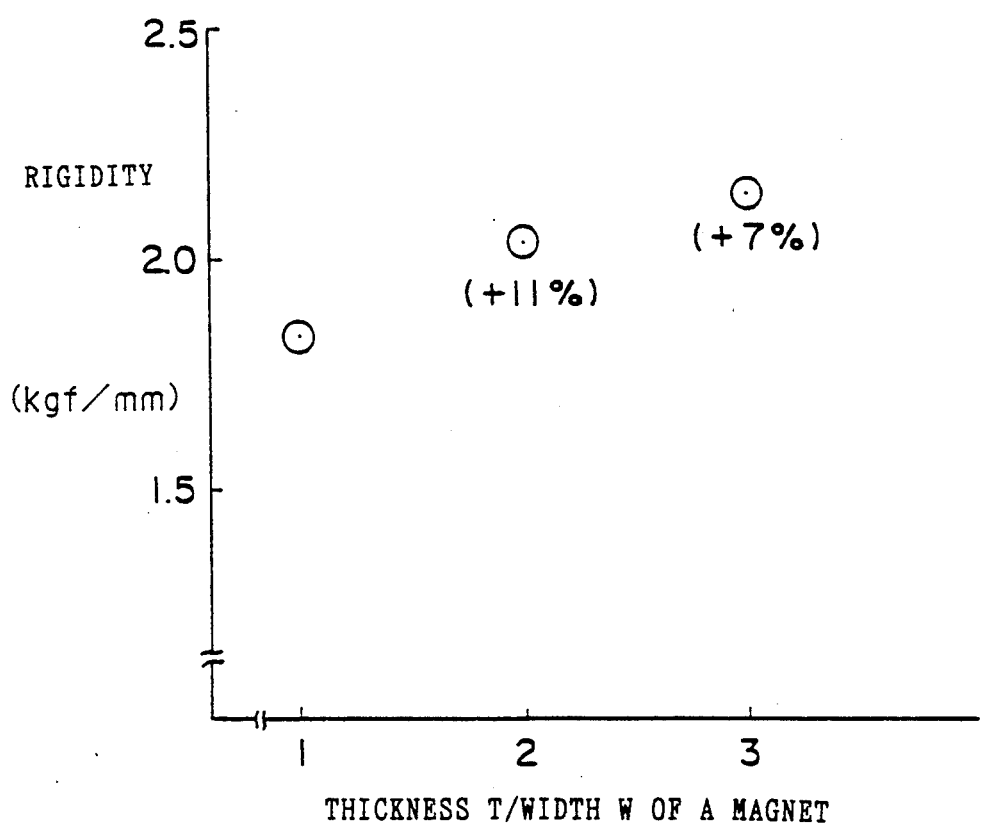
FIG. 4 shows a graph representing part of the results of the experiment done using the first embodiment of the superconduction bearing, indicating the influence of the thickness of the permanent magnets.

Experiments were also done with permanent magnet sections 2 stacked in two or three layers. When $z=3$ mm, the rigidity was 3.2 Kgf/mm and 3.4 Kgf/mm, respectively, which represented improvements only by 11% and 18% as compared to the case of a single layer, as shown in FIG. 4. It has, therefore, proved that a value of the magnet thickness corresponding to the magnet width is sufficient.

EXPERIMENT EXAMPLE 2

Figure 2:
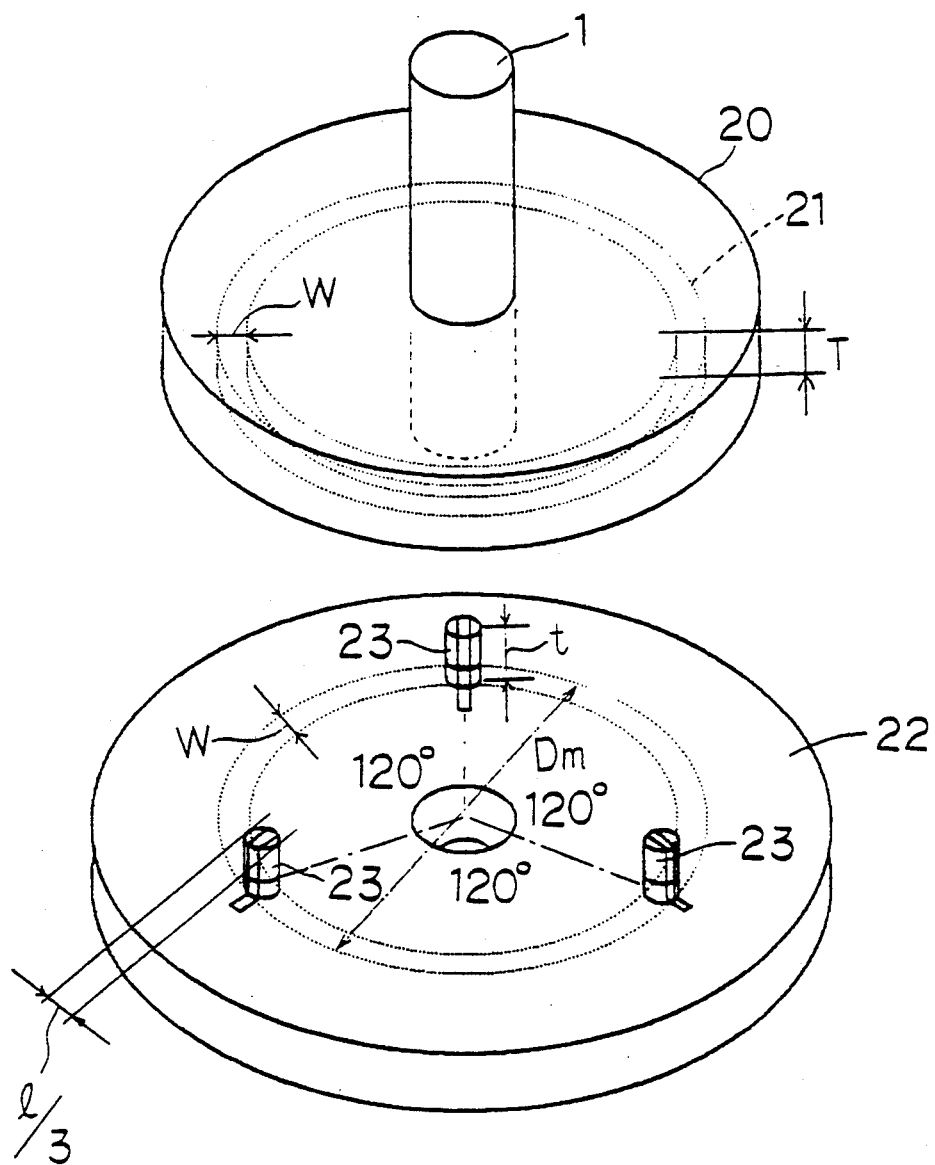
FIG. 2 is a schematic perspective view of principal parts of the first embodiment of the superconduction bearing of FIG. 1.

Experiments were also done using the apparatus of FIG. 2 to examine the influence of the magnet width W and of the superconductor thickness t upon the rigidity. In FIGS. 2, 20 designates a permanent magnet section; 21 designates a permanent magnet; 22 designates a superconductor section; 23 designates a superconductor.

Two kinds of permanent magnets 21 were used. One of them was 90 millimeters in outer diameter, 70 millimeters in inner diameter, and 12 millimeters in thickness, and had a surface magnetic flux density of 4000 gausses. The other was 200 millimeters in outer diameter, and 130 millimeters in inner diameter, and had a surface magnetic flux density of 3200 gausses. The superconductor section 22 was of an open configuration so that the position or the thickness of the superconductors could be easily changed and they could be easily held. The superconductors 23 of 35 millimeters in diam-

TABLE 1

| BEARING SPECIFICATION | | | RIGIDITY (kgf/mm) | | |
|---|---|---|---|---|---|
| CONFIGURATION OF MAGNET (mm) | CONFIGURATION OF SUPERCONDUCTOR (mm) | BEARING AREA (cm²) | Z = 2 mm | Z = 3 mm | Z = 6 mm |
| Dm = 80　W = 10　T = 12　Bmax = 4000 gausses | Dm = 80　W = 35　T = 12　all around | 50 | 4.0 | 2.9 | 1.1 |
| 2 dittos, 1 on the other | ditto | ditto | | 3.2 | |
| 3 dittos, 1 on the other | ditto | ditto | | 3.4 | |

Table 1 gives numerical data of the relation between the distance between the permanent magnets and the superconductors, and the thickness of the magnets, in accordance with the present invention. When the distance Z was 2 millimeters (z/w=0.2), the rigidity was 4.0 Kgf/mm. When Z was 3 millimeters (z/w=0.3), the rigidity was 1.1 Kgf/mm. The relation between the rigidity K and the distance z is shown in FIG. 3. Thus, there is the following relation:

$$K = Ko(b+z)^{-n} \qquad \text{Eq. 1}$$

Experiments were also done with permanent magnets stacked in two or three layers. Referring to the other experiment data, the value of n was from 1.4 to 1.8.

eter, and 12 millimeters in thickness, were positioned along a circumference of 80 or 165 millimeters in diameter, angularly spaced apart by 120 degrees from each other, in a manner corresponding to said permanent magnets 21. The thickness t of the superconductors 23 was adjusted by stacking them in 0.5, 1, 2 or 3 layers. After the permanent magnet section 20 and the superconductor section 22 were positioned relative to each other, the superconductors 23 were refrigerated into and kept in a superconducting state. Subsequently, a tension and compression tester was used to move the permanent magnet section 20 and the superconductor section 22 toward and away from each other to take measurements of the load required to cause such movement. The results are shown in Table 2.

TABLE 2

| BEARING SPECIFICATION | | | RIGIDITY (kgf/mm) | | |
|---|---|---|---|---|---|
| CONFIGURATION OF MAGNET (mm) | CONFIGURATION OF SUPERCONDUCTOR (mm) | BEARING AREA (cm²) | Z = 3 mm | Z = 6 mm | Z = 9 mm |
| Dm = 80　W = 10　T = 12　all around | Dm = 80　W = 35　l = 105 | t = 6　21 | 0.62 | 0.30 | |

TABLE 2-continued

| BEARING SPECIFICATION | | | | | | |
|---|---|---|---|---|---|---|
| CONFIGURATION OF MAGNET (mm) | CONFIGURATION OF SUPERCONDUCTOR (mm) | | BEARING AREA (cm$^2$) | RIGIDITY (kgf/mm) | | |
| | | | | Z = 3 mm | Z = 6 mm | Z = 9 mm |
| Bmax = 4000 gausses | | t = 12 | ditto | 0.82 | 0.37 | |
| | | t = 24 | ditto | 0.83 | 0.30 | |
| | | t = 36 | ditto | 0.66 | 0.40 | |
| Dm = 165 W = 35 T = 25 all around | Dm = 165 W = 35 l = 105 | t = 6 | 37 | 0.63 | 0.49 | |
| Bmax = 3200 gausses | | t = 12 | ditto | 0.81 | 0.58 | |
| | | t = 24 | ditto | 0.83 | 0.69 | |
| | | t = 36 | ditto | 0.90 | 0.72 | 0.53 |

Table 2 is a numerical representation of the relation between the permanent magnet width and the superconductor thickness in accordance with the present invention. A measurement of rigidity was taken using permanent magnets 21 of 90 millimeters in outer diameter, with the thickness t of the superconductors 23 being 12 millimeters (t/w=1) and the distance z being 3 millimeters (z/w=0.3). The value was 0.82 Kgf/mm, which was close to ⅔ times the value achieved when eight superconductors 23 were positioned along a circumference (EXPERIMENT EXAMPLE 1).

Figure 6:
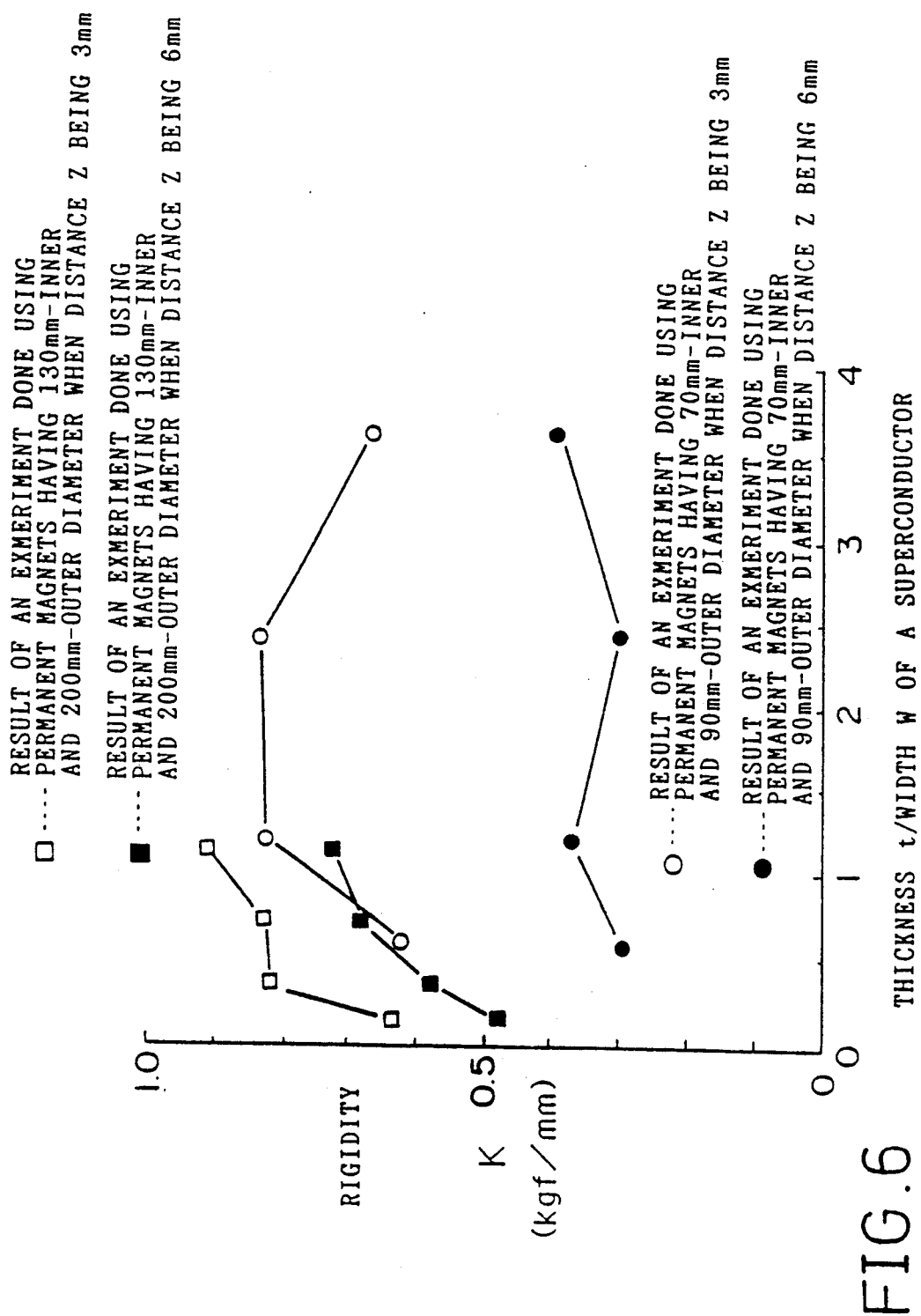
FIG. 6 shows a graph representing part of the results of the experiment done using the first embodiment of the superconduction bearing, indicating the influence of the thickness of the superconductors.

Measurements are plotted in FIG. 5, which were taken with permanent magnets 21 of 200 millimeters in outer diameter and with superconductors 23 having a thickness of 36 millimeters (t/w=1.02). Since the surface magnetic flux density of the used permanent magnets 21 and their overlapping surface area with the superconductors are different, the data are grouped into two groups. It has been proved that the rigidity K can be uniquely expressed using a dimensionless expression of distance z/w as follows:

$$K = K_0 W (0.1 + Z/W)^{-n} \quad \text{Eq. 2}$$

where the value of n is from 1.4 to 1.8 and the value of α is from 0.1 to 0.3. To examine the influence of the thickness of the superconductors upon the rigidity, relative thickness t/w was varied within the range of from 0.2 to 3.6 to take measurements of the rigidity. The measurements versus the dimensionless ratio of the thickness of the superconductors 23 to the width of the permanent magnets 21 are plotted in FIG. 6. It will be understood that the suitable value of the thickness of the superconductors 23 is within the range of from 0.5 to 1.5 times the magnet width.

In the foregoing, a rule has been proposed to optimize the thickness of the permanent magnets 21 and the thickness of the superconductors 23 using the width of the permanent magnets 21 as a basis. A rule to optimize the magnet width has then been considered analytically.

In general, the distance z (hereinafter referred to as "gap") between the rotating part (permanent magnet section 20) and the fixed part (superconductor section 22) is determined to a precision to which manufacturing or assembling steps can be performed. A precision of about 5/1000 of the maximum dimension will be adopted (which corresponds to 5 millimeters when the diameter is 1 meter).

To enhance the rigidity with a particular gap value given, it is effective to increase the width (and the thickness) of the permanent magnets 21 to decrease the relative distance z/w, as indicated by equation 2. Meanwhile, because an increase in width w of the magnets will lead to an increase in the bearing surface area, to a decrease in the surface rigidity, and further to an increase in the weight of the rotating part and to an increase in cost of the overall bearing, there must be an upper limit of the magnet width W.

With a single annular magnet having an average diameter D and a width W, because portions of superconductors situated beneath the magnet and further peripheral portions corresponding to a half of the width will be subjected to magnetic interaction, the bearing surface area is evaluated at $2\pi$ DW. When a plurality of magnets are used, since the magnets are spaced apart from each other by a spacing corresponding approximately to the magnet width so that they will not adversely affect one another, the bearing surface area for each magnet may, also in this case, be evaluated at $2\pi$ DW. From the foregoing, the rigidity per unit surface area (surface rigidity) may be expressed by the following equation 3:

$$k = K/2\pi DW = (K^0/2\pi DZ^{1-})(Z/W)^{1-}(0.1+z/W)^{-n} \quad \text{Eq. 3}$$

Figure 7:
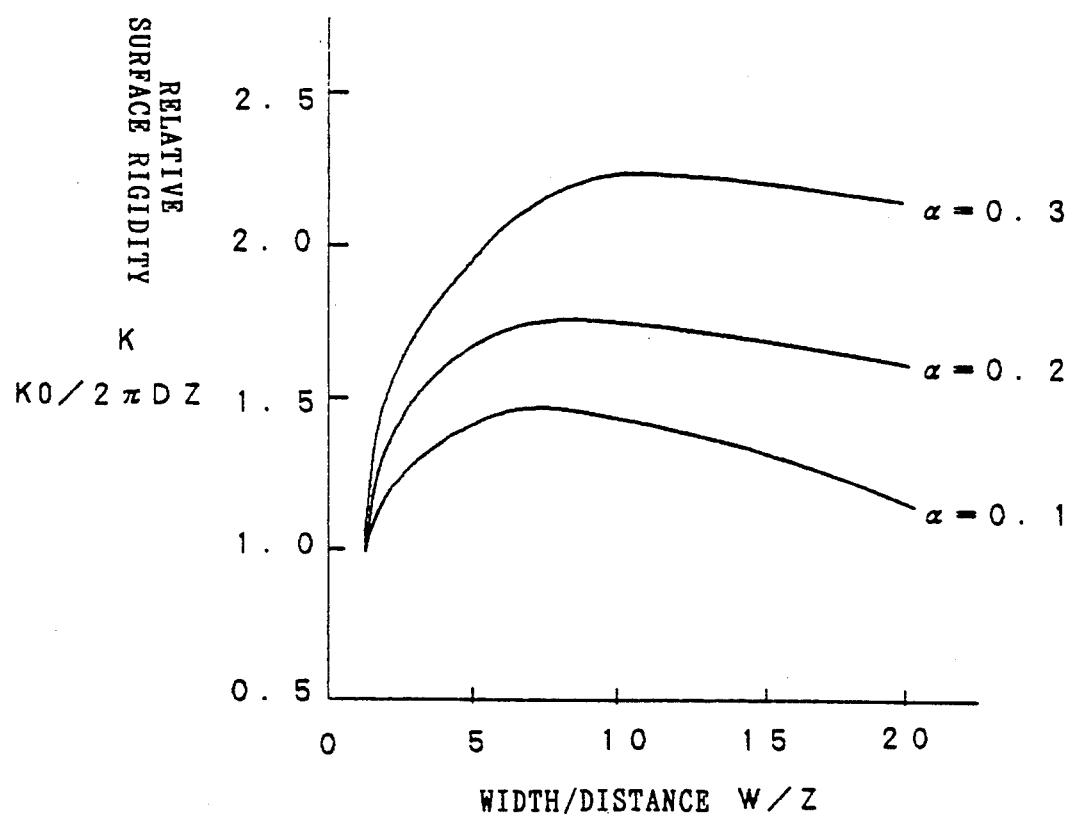
FIG. 7 shows a graph indicating the influence of both the width of the magnets and the spacing upon the surface rigidity, obtained by an analysis of the first embodiment.

In accordance with equation 3, the increase in surface rigidity caused by an increase in width of the permanent magnets 21 can be evaluated. Results of analysis are shown in FIG. 7 for the case where n=1.5 and α=0.1−0.3. In this case, it will be understood that rigidity is insufficient if the magnet width is equal to or less than 5 times the gap, while, if the magnet width is more than 10 times the gap, the effect of increasing the rigidity will not be achieved but adverse tendencies toward larger quantities of magnets and toward larger masses of the bearing rotor will appear.

Figure 8:
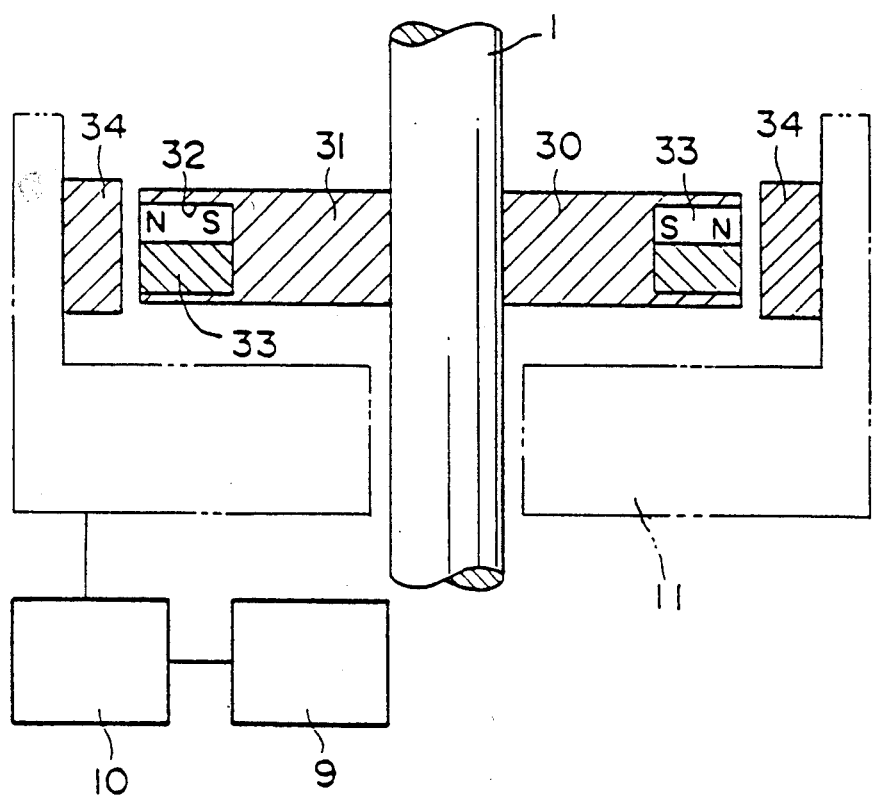
FIG. 8 is a schematic longitudinal sectional view showing principal parts of a second embodiment of the superconduction bearing.
Figure 9:
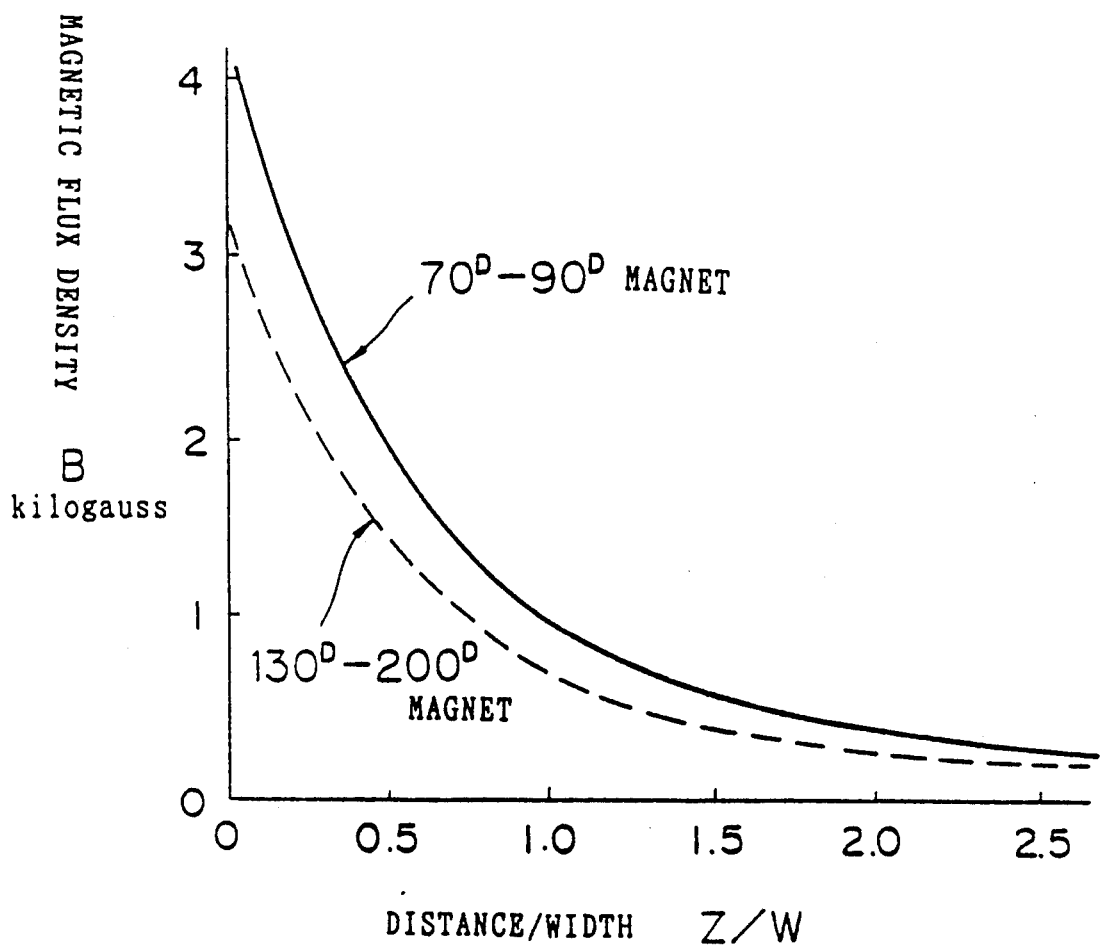
FIG. 9 is a graph indicating the distribution in space of magnetic flux generated by the permanent magnets of the first embodiment of the superconduction bearing.

FIG. 8 is a schematic representation of a second embodiment of the superconduction bearing.

In this case, a permanent magnet section 30 includes a disk 31 fixed to a rotary member 1. The disk 31 has annular grooves 32 formed in its outer peripheral region. Annular permanent magnets 33 are fixedly fitted in the annular grooves 32. The permanent magnets 33 have one magnetic pole on their inner ends adjacent to the axis of rotation of the rotary member 1, and the opposite magnetic pole on their opposite, outer ends. The axial and radial dimensions of the permanent magnets 33, i.e. the thickness and width, respectively, are 5 times the distance between the permanent magnet section 30 and the superconductor section 34 so as to increase the burden and rigidity. The thickness of the superconductors is set to from 0.5 to 1.5 times the width of the permanent magnets 33, whereby manufacturing costs are reduced.

MERITS OF THE INVENTION

Since the superconduction bearing according to the present invention is arranged as described above, it allows for the rotary member to have an increased load capacity and an enhanced rigidity. Moreover, run-out of the rotary member can be reduced, whereby the rotary member can be supported in a stable, non-contacting manner. In addition, it is possible to minimize the dimensions of the magnets, whereby reduction of manufacturing cost can be promoted.

What is claimed is:

1. A superconduction bearing comprising:
    a rotor including an axle-like rotary member and a disk disposed around said axle-like rotary member;
    a supporting means, cooled by cooling medium, for supporting a plurality of superconductors, said supporting means including at least a horizontally extending flat plate having a central hole formed therein and an upstanding circumferential wall provided on said flat plate;
    said disk including a ring-shaped series of recesses formed therein;
    superconductors arranged, at even intervals, in a concentric circle surrounding said axle-like rotary member;
    said axle-like rotary member being oriented in a vertical direction so that a lower end of said axle-like rotary member is passed through said central hole;
    said disk being placed above said flat plate and radially inside of said circumferential wall; and
    a plurality of permanent magnets disposed at a distance from said superconductors, each of said magnets disposed in one of said series of recesses;
    each of said permanent magnets having a top surface and a bottom surface, said top surface and said bottom surface of each of said permanent magnets being oppositely magnetized relative to each other, each of said permanent magnets having a width which is 5 to 10 times as large as said distance between said superconductors and permanent magnets.

2. The superconduction bearing as defined in claim 1, wherein each of said superconductors has a thickness which is 0.5 to 1.5 times the width of each of said permanent magnets.

3. The superconduction bearing as defined in claim 1, and further comprising an annular support interposed between said horizontally extending flat plate and said disk, said annular support having said superconductors arranged therein, a reverse side of said disk having said series of recesses formed therein, the number of permanent magnets corresponding to the number of said superconductors arranged in said concentric circle.

4. The superconduction bearing as defined in claim 2, wherein said superconductors are arranged on said upstanding circumferential wall and said recesses are formed in a radially outer surface of said disk, the number of permanent magnets corresponding to the number of said superconductors arranged in said concentric circle, the permanent magnets being so magnetized that opposite poles appear alternatively in a radial direction of said disk.

* * * * *